Figure 1:
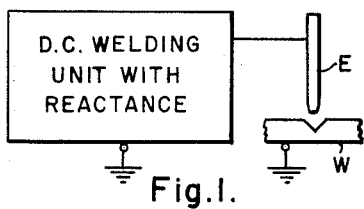
Figure 2:
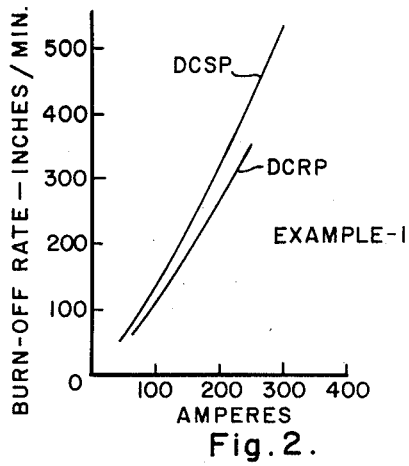

Dec. 8, 1964

E. R. GAMBERG 3,160,732

ELECTRODE FOR ARC WELDING AND METHOD
OF USING SUCH ELECTRODE

Filed June 27, 1962

WITNESSES
Edwin E. Basler
James F. Young

INVENTOR
Edward R. Gamberg
BY
Hymen Leamed
ATTORNEY

3,160,732
ELECTRODE FOR ARC WELDING AND METHOD OF USING SUCH ELECTRODE
Edward R. Gamberg, Clarence, N.Y., assignor to Westinghouse Electric Corporation, East Pittsburgh, Pa., a corporation of Pennsylvania
Filed June 27, 1962, Ser. No. 205,660
4 Claims. (Cl. 219—74)

This invention relates to arc welding and has particular relationship to arc welding with a consumable electrode in a gaseous atmosphere.

It is the present practice to weld thin materials of mild steel and related alloys with a consumable electrode of mild steel which is either bare or coated by flashing with copper. The welding is usually carried out with a direct-current power-supply as disclosed in Adamson Rebuffoni Patent 3,129,352 granted April 14, 1964 connected to weld at reverse polarity. Such a power-supply has predetermined reactance. The welding is carried out in a shield or atmosphere of carbon dioxide or a mixture of inert gas and carbon dioxide (or oxygen) with the current maintained at a magnitude lower than the magnitude at which the deposit is of the spray type. The welding is stabilized by the reactor. The power supply is usually connected to weld at reverse polarity.

In welding in this way difficulty in producing acceptable welds was encountered when the voltage impressed between the electrode and the work and the arc current departed from narrow limits which depended on the material being welded and its dimensions. The requirement of maintaining the voltage and the current within narrow limits seriously hinders the use of this process since in the usual situation encountered in industry the line voltage varies widely and this variation frequently causes the voltage impressed between the electrodes and the work and the resulting current to depart from the permissible limits. The result is excessive scrap and the necessity and cost of reworking joints which had been completed.

It is an object of this invention to overcome the above-described disadvantages of the prior art practice.

A more specific object of this invention is to provide an electrode in the use of which the above-described disadvantages of the prior art are overcome.

Another specific object of this invention is to provide a method of arc welding in the practice of which the above-described disadvantages of the prior art are overcome.

More specifically stated, it is an object of this invention to provide an electrode and a method of arc welding in a shield or atmosphere of protective gas at currents below magnitudes for which the deposit of metal from the electrode is of the spray type, which shall produce acceptable welds in spite of the circumstance that the welding current and voltage vary over a relatively wide range.

In accordance with this invention a method is provided in the practice of which the welding is carried out in a protective gaseous shield with a welding electrode having a thin or wash coating of mixtures of manganese dioxide, titanium dioxide and calcium. The welding is carried out with a direct-current power supply including reactance with the potential of the supply and the welding current set in a range of magnitudes such that the deposit from the electrode is of the globular or drop type; that is at a magnitude lower than that at which the deposit from the welding electrode is of the spray type. The shielding atmosphere is composed of a mixture of an inert gas and carbon dioxide; the composition extending over the range between 100% carbon dioxide and 0% inert gas and 25% carbon dioxide and 75% inert gas. The electrode preferably comprises a core of ferrous wire coated with mixtures of combinations of manganese dioxide, titanium dioxide and calcium oxide within the following ranges: manganese dioxide 17.4% to 23.5%, titanium dioxide 56.5% to 76.5%, calcium oxide 0% to 26.1%. Typically, the core may have the following composition: carbon .09% to .15%, manganese .90% to 1.20%, silicon .20% to .45%, phosphorus less than .035%, sulfur less than .035%, iron remainder.

The coating is deposited on the core with the apparatus, and by practicing the methods taught in Cotter Patent 2,883,306. The components are formed into a slip with a liquid. The core wire is roughened and the electrode is deposited with the apparatus disclosed in the Cotter patent. The coating is very thin and in a typical situation varies between 2 milligrams and 10 milligrams per foot of core wire. The core wire may vary in diameter over a wide range but typically the diameter lies between .040 inch and .0625 inch.

In addition to the above-described method the invention contemplates within its mode an electrode as just described.

In the practice of this invention a number of welds were made in shielding atmospheres of different mixtures of argon and carbon dioxide within the above-defined limits. The welds were made with electrodes having the above-described core and diameters between .040 and .0625 inch. The coatings were of different compositions of manganese dioxide, titanium dioxide and calcium oxide within the above-defined limits. The work with which the welds were produced was composed of mild steel and de-sulfurized steel. The welding currents were between 40 amperes and 180 amperes for .040 diameter electrode and between 50 amperes and 280 amperes for .0625 inch diameter electrode.

In a typical situation the welding was carried out at straight polarity with an electrode of .040 inch diameter and with an arc current at 120 amperes. It was found that sound and acceptable welds could be produced with the potential supplied between the electrode and the work varying between 18 and 24 volts. This typical practice of this invention may be compared with the prior art welding of a similar .040 inch diameter bare or copper coated wire and with the welding current at 120 amperes. In the prior art welding, the supply potential between the electrode and the work must be maintained between 19 and 21 volts to produce acceptable welds.

The novel features considered characteristic of this invention are descirbed generally above. For a better understanding of the invention, both as to its organization and to its method of operation, together with additional objects and advantages thereof reference is made to the following description of specific embodiments taken in connection with the accompanying drawings in which:

FIGURE 1 is a block diagram showing the apparatus used in the practice of this invention; and FIGS. 2 through 5 are graphs showing the burn-off rate of the electrode as a function of the arc current in welding in accordance with this invention.

In the practice of this invention a wash coated electrode E as described above is used to weld the work W. The electrode is supplied continuously through a gun or torch (not shown) and is fused or melted in the heat of the arc. The melted material is deposited on the work W. The power for welding is preferably supplied by a direct-current welding unit with reactance as disclosed in the Adamson-Rebuffoni Patent 3,129,352. With such apparatus the welding may be carried out with deposit in the form of droplets at relatively low currents and thin materials may be readily welded.

A number of welds with electrodes coated with different compositions of manganese dioxide, titanium dioxide and calcium oxide were made in the practice of this invention in shields or atmospheres of different compositions of argon and carbon dioxide between the range of 100% carbon dioxide and 0% argon and 25% carbon dioxide and 75% argon. The compositions of coatings used in typical examples are presented in the following table.

*Table I*

| Example No. | TiO₂ | MnO₂ | CaO |
|---|---|---|---|
| 1 | 65 | 20 | 15 |
| 2 | 76.5 | 23.5 | 0 |
| 3 | 70.3 | 21.6 | 8.1 |
| 4 | 56.5 | 17.4 | 26.1 |

The electrode in Examples 1 through 4 had a core having the following compositions:

| | |
|---|---|
| Carbon | .09% to .15%. |
| Manganese | .90% to .120%. |
| Silicon | .20% to .45%. |
| Phosphorus | Less than .035%. |
| Sulfur | Less than .035%. |
| Iron | Remainder. |

All electrodes had a diameter of .040 inch. The work was of mild steel. In each case the welds were carried out in an atmosphere of 50% argon and 50% carbon dioxide. Welds were made both at straight polarity and at reverse polarity with the above-described apparatus. All welds were satisfactory.

The burn-off rates for each of the examples is shown in FIGS. 2 through 5. Each figure discloses a graph in which the burn-off rate in inches per minute is plotted vertically and the welding current is plotted horizontally. The graphs are labeled DCSP to indicate the straight polarity and DCRP to indicate the reverse polarity graph. Each of the graphs is labeled with the example to which it corresponds.

Figure 3:
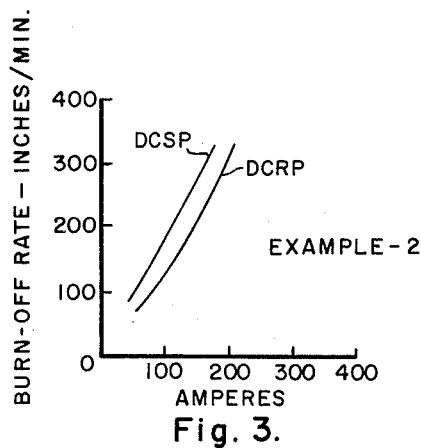
Figure 4:
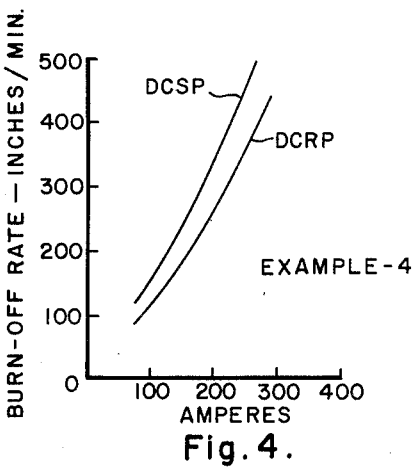
Figure 5:
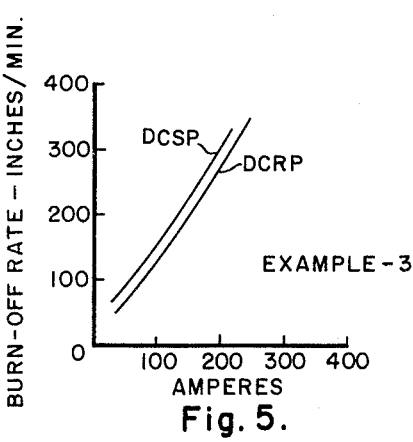

In any actual case the selection of the coating should be governed by the character of the welding to be carried out. FIG. 3 shows that the electrode corresponding to Example 2; that is with no calcium oxide, deposits approximately 33% more weld metal than the others. Where the joint is a tight-fit lap fillet there is a tendency with the electrode of Example 2 to deposit more metal than is required and a convex weld results. In this case an electrode with a lower burn-off rate would be desirable. Where gaps are present in the joint the higher deposit rate of the electrode of Example 2 is to be preferred.

While preferred embodiments of this invention have been disclosed herein many modifications thereof are feasible. This invention then is not to be restricted except insofar as is necessitated by the spirit of the prior art.

I claim as my invention:

1. The method of arc-welding ferrous work with a wash-coated ferrous consumable welding electrode energized from a direct-current power supply having reactance, the said method comprising impressing a potential form said supply between said electrode and work to produce a welding arc between said electrode and work to melt said electrode and deposit the melted material from said electrode on said work, the regulation of said supply permitting said potential to vary over a substantial range, the current of said arc being maintained at a magnitude below the range in which the melted material flows to the work in the form of a spray, and shielding said arc in an atmosphere of a mixture of inert gas and carbon dioxide having a composition by volume of about between 0% inert gas and 100% carbon dioxide and 75% inert gas and 25% carbon dioxide, said coating comprising essentially a mixture of the components manganese dioxide, titanium dioxide, and calcium oxide in which the quantities of said components are within the following ranges:

| | |
|---|---|
| Manganese dioxide | Between about 17.4% and 23.5%. |
| Titanium dioxide | Between about 56.6% and 76.5%. |
| Calcium oxide | Between about 0% and 26.1%. | sound welds being produced with the electrode-work potential varying over said substantial range by the cooperation of said coating in the welding operation.

2. The method of arc-welding ferrous work with a wash-coated ferrous consumable welding electrode energized from a direct-current power supply, the said method comprising impressing a potential from said supply between said electrode and work to produce a welding arc between said electrode and work to melt said electrode and deposit the melted material from said electrode on said work, and shielding said arc in an atmosphere of a mixture of inert gas and carbon dioxide having a composition by volume of about between 0% inert gas and 100% carbon dioxide and 75% inert gas and 25% carbon dioxide, said coating comprising essentially a mixture of the components manganese dioxide, titanium dioxide and calcium oxide in which the quantities of said components are within the following ranges:

| | |
|---|---|
| Manganese dioxide | Between about 17.4% and 23.5%. |
| Titanium dioxide | Between about 56.6% and 76.5%. |
| Calcium oxide | Between about 0% and 26.1%. | different coatings within said ranges producing different electrode burn-off rates as a function of welding current, the welding in each case being carried out with an electrode having a coating producing the burn-off rate most suitable for the welding in said case.

3. An electrode for arc welding, in the drop-transfer current range, with a supply having regulation permitting the potential between the electrode and the work during welding to vary over a substantial range, in mixtures of inert gas and carbon dioxide having compositions by volume of about between 0% inert gas and 100% carbon dioxide and
75% inert gas and 25% carbon dioxide the said electrode comprising a core of steel having essentially the composition

| | |
|---|---|
| Carbon | .09% to .15%. |
| Manganese | .90% to 1.20%. |
| Silicon | .20% to .45%. |
| Sulfur | Less than .035%. |
| Phosphorus | Less than .035%. |
| Iron | Remainder. | said core having a thin coating essentially the following composition

Manganese dioxide about between 17.4% and 23.5%.
Calcium oxide about between 0% and 26.1%.
Titanium dioxide about between 56.5% and 76.5%.

sound welds being produced with the electrode-work potential varying over said substantial range by the cooperation of said coating in the welding operation.

4. The method of arc-welding ferrous work with a wash-coated ferrous consumable welding electrode energized from a direct-current power supply, the said method comprising impressing a potential from said supply between said electrode and work to produce a welding arc between said electrode and work to melt said electrode and deposit the melted material from said electrode on said work, the regulation of said supply permitting said potential to vary over a substantial range, and shielding said arc in an atmosphere of a mixture of inert gas and carbon dioxide having a composition by volume of about between 0% inert gas and 100% carbon dioxide and 75% inert gas and 25% carbon dioxide, said coating comprising essentially a mixture of the components manganese dioxide, titanium dioxide and calcium oxide in which the quantities of said components are within the following ranges:

Manganese dioxide __ Between about 17.4% and 23.5%.
Titanium dioxide ___ Between about 56.6% and 76.5%.
Calcium oxide _____ Between about 0% and 26.1%.

sound welds being produced with the electrode-work potential over said substantial range by the cooperation of said coating in the welding operation.

References Cited in the file of this patent

UNITED STATES PATENTS

| | | |
|---|---|---|
| 1,374,711 | Armor | Apr. 12, 1921 |
| 2,818,352 | Ludwig et al. | Dec. 31, 1957 |
| 2,818,353 | Ludwig | Dec. 31, 1957 |
| 2,818,496 | Ludwig | Dec. 31, 1957 |
| 2,883,306 | Cotter | Apr. 21, 1959 |
| 2,961,351 | Ludwig | Nov. 22, 1960 |
| 3,051,823 | Craig | Aug. 28, 1962 |